Figure 1:
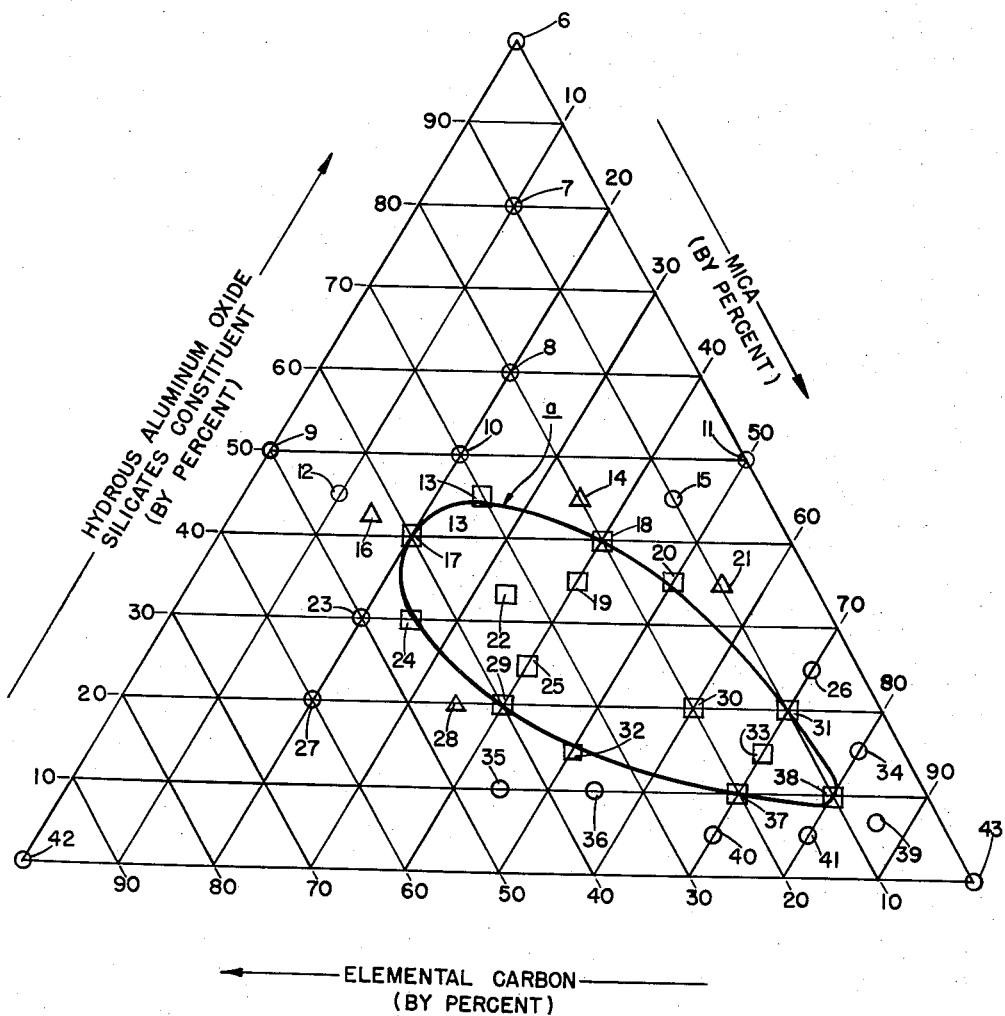

O NUT SEIZED, BOLT SHEARED
△ NUT SEIZED, THREADS STRIPPED ON REMOVAL
□ NUT READILY REMOVABLE, NUT AND BOLT REUSABLE

*INVENTOR.*
OTTO T. PFEFFERKORN
BY
ATTORNEY 3,041,277
ANTI-SEIZE AND SEALING COMPOSITION
AND METHOD
Otto T. Pfefferkorn, Arcadia, Calif., assignor to
North American Aviation, Inc.
Filed Jan. 12, 1959, Ser. No. 786,211
18 Claims. (Cl. 252—30)

This invention relates to the protection of metal surfaces against oxidation at high temperatures. It is more specifically concerned with a composition and method effective to protect a metal surface against oxidation and to prevent seizure of threaded or otherwise engaging elements as the result of exposure to extremely high temperatures.

With the advent of atomic, jet and rocket systems, as well as related developments, materials of construction have been required which are capable of withstanding increasingly higher temperatures and extreme environments. One of the more severe problems encountered has been the necessity for protecting metal surfaces from the adverse corrosive effects of high temperature environments. An important aspect of this problem has been the elimination of fusion joinder of abutting metal surfaces and especially the surfaces of engaging threaded metallic elements.

Unfortunately, although a great variety of anti-seize compositions and methods for preventing thread seizure have been widely used in the past, their utility is severely restricted by temperature limitations on effectiveness. It is normally expected that conventional anti-seize compounds will be routinely effective at temperatures below approximately 500° F. Some of these compositions contain graphite as one of the prime constituents in order to provide the composition with lubricating characteristics. Notwithstanding the effectiveness of such compositions at temperatures below 500° F., the maximum temperature at which they are generally considered to have effective useful lives is approximately 1000° F. An important reason for the limited reliability of graphite-containing anti-seize compositions is the tendency of the graphite to be eliminated in the form of carbon monoxide or carbon dioxide, or both, as the result of oxidation reactions which occur at the relatively high temperatures of intended use. Because of this graphite elimination at high temperatures, as well as because of the inherent inability of the remaining constituents of such compositions to maintain a continuous film, the bare metal is exposed to the atmosphere of use at the large area voids which thus occur in conventional coatings at high temperatures. The result of exposure is oxidation of the metal, especially in the non-contacting areas of the threadily engaging elements, and the fusion or brazing of the abutting portions of the metallic elements as a consequence of the metal to metal surface contact. Even when using conventional coatings which do not develop voids or other discontinuities as a direct result of the heating of the elements to high temperatures, these compositions have insufficient adherence to the metal surfaces to prevent seizure upon attempted disengagement of the mating metal surfaces of these parts. Relative movement of the parts in this instance wipes the coating from portions of the surfaces, thus exposing the parts to metal to metal contact, with a consequent cold welding of the parts.

Various other anti-seize compositions, such as those which contain lead or lead salts, are similarly ineffective at high temperatures because of their attack upon metal surfaces. While such compositions may tend to provide some degree of protection against seizure of the elements to which they are applied, their use at high temperatures is accompanied by intergranular penetration of the metal surfaces with the consequent embrittlement of the metal surfaces, the deterioration of the surface finish, and a substantial loss of tensile strength.

Still other compositions which have been conventionally used are those which contain polymeric or other resinous constituents. These compositions are also ineffective at high temperatures not only because of their failure to provide anti-seize protection at high temperatures but also because of their tendency to add organic impurities to the systems in conjunction with which they are used. Furthermore, compositions having oil or grease bases burn, char, vaporize or form gums or varnishes at high temperatures, thus accentuating the seizure problem.

It is, therefore, a principal object of my invention to provide an anti-seize composition, comprising an aluminum oxide-silicate constituent, a micaceous constituent and elemental carbon, which is effective to prevent the oxidation and seizure of abutting metal elements at temperatures in excess of 2000° F., without causing intergranular penetration by any of the constituents of the composition and without providing a source of impurities for the environment of use. It is a further object of my invention to provide a composition which is not only effective in the prevention of oxidation and adhesion of mating metal surfaces at temperatures as high or higher than 2000° F., but which is also effective in providing a gas diffusion seal. I also desire to provide an anti-seize composition which will prevent seizure between mating threaded surfaces after exposure to high temperatures in an oxidizing atmosphere, thereby permitting disconnection of the assembled threaded elements.

These, as well as further objects of my invention, will appear from the immediately following description as related to the drawing; FIGURE 1 of which is a three phase constitution diagram.

Turning now to the details of my invention, the essential ingredients of my high temperature thread seizure inhibiting composition are an hydrous aluminum oxide silicates constituent having a Mohs hardness of not more than 5, a micaceous material and elemental carbon of a hardness of not more than 5 on the Mohs scale.

The particle size of the individual constituents of the anti-seize composition is a factor of some importance. A coating composition constituted of relatively large sized particles would present substantial void or uncoated areas on the metal surface, thus permitting the oxidation of such uncoated areas at high temperatures. Because of the necessity for having as continuous a film as possible, it is preferred to utilize a composition having a mean particle size of less than about 300 mesh. However, since the constituents of my composition have a Mohs hardness which is less than that of the metals to which the composition will be applied, effectiveness can be retained even though particle size is considerably greater than 300 mesh. This is especially true where the composition is applied to mating threaded surfaces, since threading the elements together will result in particulation of the composition to a state of subdivision approaching 300 mesh or less. In any event, I have found that compositions which have mean particle sizes of less than 60 mesh will function in the desired manner.

Since the active constituents of my composition are in the form of dry powders, it is perfectly feasible to apply them to the metal surfaces to be protected by simply dusting thereon. However, in this event, it is most important to make absolutely certain that the powder completely covers the metal surfaces of the elements to be engaged. Nevertheless, for most applications, it is preferred to incorporate the dry composition in a sufficient quantity of an inexpensive vehicle, such as water, to give a paste-like consistency. In system environments where contamination does not constitute a problem, various organic solvents such as the alcohols, glycerol, ethers, ketones, esters, alcohol-esters and other liquids which give fluidity to the dry composition, may be employed as the vehicle. In any event, the quantity of vehicle utilized is not critical. It is, nevertheless, preferred to use one to three parts of vehicle for every part of the active constituents composition.

While the mechanism by which my composition functions has not been conclusively established, it has been found that upon application to the metal surface to be protected, a continuous, thin protective film is formed which has sufficient adherence to metal surfaces to avoid being wiped therefrom upon relative movement of the engaging elements. Because of the relative softness of my composition, as well as its absence of excessive coherence, it functions very effectively as a lubricant at low temperatures.

As environmental temperatures increase, it is further believed that the aluminum oxide silicates decompose to form metal silicates which provide an impervious film through which gases will not diffuse. It is also quite probable that the micaceous constituent, which dehydrates and provides water for reaction with the elemental carbon to form a partly reducing atmosphere of CO and $CO_2$, also decomposes to form metal silicates which contribute to the impervious film. The so-formed silicates act as sorption agents for the products of decomposition of carbon and the water of dehydration of the micaceous constituent.

In addition to providing a source of water of dehydration for reaction with carbon to provide the partially reducing atmosphere, the mica serves the important function of expanding upon heating. This insures retention of film continuity, thus preventing the development of voids and cracks in the film.

The composition is also believed to react with the metal surface to a minute extent to provide an adherent coating which not only constitutes a mechanical barrier to the passage of oxidizing gases but also constitutes a lubricant which permits the subsequent easy disengagement of the threaded elements.

It will be clear from the foregoing that each of the constituents of my composition serves a multiple function. Thus, elemental carbon acts as a lubricant during initial engagement of the threaded surfaces, encourages the partial breakdown of the silicious components to form metal silicates, and provides a source material for the partially reducing atmosphere reaction product. Similarly, the micaceous material provides a source of water of dehydration that is essential to the creation of the partially reducing atmosphere. It also performs the important function of permitting some movement in the anti-seize composition without failure of its function as a mechanical barrier as the result of its expansion upon heating. The hydrous aluminum oxide-silicates not only perform a sorbing function during the breakdown of the silicate to hold the products of decomposition of silicates and graphite but also limit the extent of the reaction of the coating with the metal surface to provide an extremely thin, surface-bonded film which accomplishes a lubricating function upon subsequent disengagement of the threaded elements.

I have found that the hydrous aluminum oxide silicates not only perform a sorption function extremely well but also decompose at high temperature to provide moisture and to insure sufficient reaction with the metal surface to provide a continuous lubricating film for the element. Exemplary of the minerals which may be employed to advantage in my composition are montmorillonite $[(Mg,Ca)O.Al_2O_3.5SiO_2.nH_2O]$, pyrophillite $[Al_2O_3.4SiO_2.H_2O]$, halloysite [hydrous silicates of Al] and kaolin $[Al_2O_3.2H_2O.2SiO_2]$. The above clays and clay constituents are hydrous silicates of alumina, also referred to as hydrous aluminum silicates. In view of its ready availability, it is preferred to use the latter material. It will, nevertheless, be understood that I comprehend the employment of any hydrous aluminum oxide silicate material, irrespective of whether or not it contains additional metal oxides, so long as the hardness of the material is less than 5 on the Mohs scale.

In referring to the utilization of mica or a micaceous constituent, it is intended to include all those materials which are conventionally so classified. These minerals are generally characterized by a monoclinic crystalline structure and a very even cleavage. Some non-limitative examples of mica or micaceous constituents are vermiculite
$$[3MgO.(FeAl)_2O_3.3SiO_2]$$
muscovite
$$[H_2KAl_3(SiO_4)_3]$$
paragonite
$$[(H_2NaAl_3(SiO_4)_3]$$
biotite
$$[H_2K(MgFe)_3(AlFe)(SiO_4)_3]$$
phlogopite
$$[H_2KMgSi(SiO_4)_3]$$
and lepidomelane.

Although it is preferred to employ graphite for the elemental carbon constituent of my composition, it will be clear that other carbonaceous materials such as carbon black or granulated coal will function equally well.

The details and advantages of my invention will become more apparent from a consideration of the following illustrative examples.

*Examples 1–43*

Equal parts by weight of minus 300 mesh graphite, kaolin and vermiculite were mixed to form an active constituents dry powder. Two parts by weight of water was then added to one part by weight of the dry powder in order to form a suspension of paste-like consistency. This suspension was then brushed on the threaded surfaces of a ¼-inch diameter Inconel X bolt after which a nut was tightened down on the bolt. The resulting assembly was subsequently placed in an air atmosphere furnace and subjected to a temperature of 800° F. for a period of 30 hours, after which the temperature was increased to 2000° F. and the assembly retained at that temperature for 35 hours. Second and third Inconel X bolt and nut assemblies were treated in exactly the same manner except that no anti-seize composition whatever was applied to the surfaces of the second assembly, while a conventional anti-seize composition consisting of lead oxides, graphite and oils was applied to the third bolt and nut assembly. After removal from the furnace and cooling to room temperature, it was found that although it was impossible to remove the nut from the bolt for the second and third assemblies, the threads of the bolt treated with my composition were not only found to be undamaged but the nut could be easily removed therefrom and the nut and bolt were both reusable.

Although an anti-seize composition containing equal parts by weight of each of the hydrous aluminum oxide silicates, elemental carbon and micaceous constituents is of superlative effectiveness, I have nevertheless discovered that compositions containing these constituents in different proportions will function equally satisfactorily. In order to demonstrate the critical proportions, the following comparative tests were performed.

The quantities of graphite, kaolin and mica indicated in Table I for each example were mixed to form an active constituents dry powder, for every part by weight of which, one part of water was added to give a suspension of brushable consistency. The respective resulting compositions were then individually brushed on the threaded surfaces of ¼-inch Inconel X and stainless steel bolts after which nuts were tensioned thereon. The resulting torqued nut and bolt assemblies were subsequently placed in an oven at 1600° F. and the temperature raised to 2100° F. over a period of two hours. These assemblies were thereafter held at 2100° F. for a period of one hour, air-cooled to 800° F., placed back in the furnace at a temperature of 2100° F., retained at that temperature for a period of two hours, and finally air-cooled to room temperature for the nut-removal tests. The results of these tests are specified in Table I.

and 27 contained 20% of mica, only the composition of Example 17 prevented thread seizure and permitted removal and reuse of the nut and bolt assembly. The critical minimum percentages of each of the three constituents of my composition are thus defined by curve a of FIGURE 1. This curve encloses an area on the constitution diagram which represents varying contents of compositions containing the hydrous aluminum oxide silicates, elemental carbon and micaceous constituents which will accomplish the objectives herein previously set forth.

TABLE I

| Example No. | Anti-seize composition (parts by weight) | | | Nut removal tests after 2,100° F. in air | |
|---|---|---|---|---|---|
| | Hydrous aluminum oxide silicates (kaolin) | Elemental carbon (graphite) | Mica | Inconel | Stainless steel |
| 4 | None | None | None | Nut seized—Bolt sheared | Nut seized—Bolt sheared. |
| 5 | None | None | None | ___do___ | Do. |
| 6 | 100 | 0 | 0 | ___do___ | Do. |
| 7 | 80 | 10 | 10 | ___do___ | Do. |
| 8 | 60 | 20 | 20 | ___do___ | Do. |
| 9 | 50 | 50 | 0 | ___do___ | Do. |
| 10 | 50 | 30 | 20 | ___do___ | Do. |
| 11 | 50 | 0 | 50 | ___do___ | Do. |
| 12 | 45 | 45 | 10 | ___do___ | Do. |
| 13 | 45 | 30 | 25 | Nut readily removable, nut and bolt reusable | Nut readily removable, nut and bolt reusable. |
| 14 | 45 | 20 | 35 | Nut seized—Threads stripped on removal | Nut seized—Threads stripped on removal. |
| 15 | 45 | 10 | 45 | Nut seized—Bolt sheared | Nut seized—Bolt sheared. |
| 16 | 42.5 | 42.5 | 15 | Nut seized—Threads stripped on removal | Nut seized—Threads stripped on removal. |
| 17 | 40 | 40 | 20 | Nut readily removable, nut and bolt reusable | Nut readily removable, nut and bolt reusable. |
| 18 | 40 | 20 | 40 | ___do___ | Do. |
| 19 | 35 | 25 | 40 | ___do___ | Do. |
| 20 | 35 | 15 | 50 | ___do___ | Do. |
| 21 | 35 | 10 | 55 | Nuts seized—Threads stripped on removal | Nut seized—Threads stripped on removal. |
| 22 | 33.3 | 33.3 | 33.3 | Nut readily removable, nut and bolt reusable | Nut readily removable, nut and bolt reusable. |
| 23 | 30 | 50 | 20 | Nut seized—bolt sheared | Nut seized—Bolt sheared. |
| 24 | 30 | 45 | 25 | Nut readily removable, nut and bolt reusable | Nut readily removable—Nut and bolt reusable. |
| 25 | 25 | 35 | 40 | ___do___ | Do. |
| 26 | 25 | 5 | 70 | Nut seized—Bolt sheared | Nut seized—Bolt sheared. |
| 27 | 20 | 60 | 20 | ___do___ | Do. |
| 28 | 20 | 45 | 35 | Nut seized—Threads stripped on removal | Nut seized—Threads stripped on removal. |
| 29 | 20 | 40 | 40 | Nut readily removable, nut and bolt reusable | Nut readily removable, nut and bolt reusable. |
| 30 | 20 | 20 | 60 | ___do___ | Do. |
| 31 | 20 | 10 | 70 | ___do___ | Do. |
| 32 | 15 | 35 | 50 | ___do___ | Do. |
| 33 | 15 | 15 | 70 | ___do___ | Do. |
| 34 | 15 | 5 | 80 | Nut seized—Bolt sheared | Nut seized—Bolt sheared. |
| 35 | 10 | 45 | 45 | ___do___ | Do. |
| 36 | 10 | 35 | 55 | ___do___ | Do. |
| 37 | 10 | 20 | 70 | Nut readily removable, nut and bolt reusable | Nut readily removable, nut and bolt reusable. |
| 38 | 10 | 10 | 80 | ___do___ | Do. |
| 39 | 7.5 | 7.5 | 85 | Nut seized—Bolt sheared | Nut seized—Bolt sheared. |
| 40 | 5 | 25 | 70 | ___do___ | Do. |
| 41 | 5 | 15 | 80 | ___do___ | Do. |
| 42 | 0 | 100 | 0 | ___do___ | Do. |
| 43 | 0 | 0 | 100 | ___do___ | Do. |

It will not only be noted from Table I that those nut and bolt assemblies which were not treated with an anti-seize composition could not be disengaged without destruction, after their exposure to high temperatures, but also that a fairly specific range of critical proportions of the constituents exists. In order to more clearly define this range of critical proportions, the test results for the compositions of Examples 6 through 43 have been plotted on the three phase constitution diagram of FIGURE 1. As indicated in the notation below the diagram of FIGURE 1, the circle represents a condition of seizure of the nut and shearing of the bolt upon attempted removal, while the triangle represents a condition of seizure of the nut and stripping of the threads upon removal of the nut, and the square represents a condition of no seizure of the nut and easy removability and reusability of the nut and bolt.

It will be seen from Table I and FIGURE 1 that no constant minimum percentage constitution of any one of the components exists. For example, in considering the minimum critical percentage constitution of kaolin in the composition, it will be seen from FIGURE 1 that although the compositions of Examples 35, 36, 37 and 38 all contain 10% kaolin, only the compositions of Examples 37 and 38 performed their function satisfactorily. Similarly with respect to the graphite component of Examples 15, 21, 31 and 38, representing compositions all having 10% of graphite, only the compositions of Examples 31 and 38 performed satisfactorily. The same observation can be made with respect to the mica constituent of the composition since, although each of Examples 8, 10, 17, 23

It will, nevertheless, be apparent that although thread seizure did occur for compositions containing proportions of the three ingredients not far removed from compositions which did function properly, thread seizure was not quite as severe as it was for compositions containing proportions of ingredients far removed from those which did function satisfactorily. Because the extent of oxidation encountered and seizure obtained is a function of the extremity of the environment of use, the compositions of Examples 14, 16, 21 and 28, as well as various other compositions approaching but outside of curve a, could be expected to function in at least a partly satisfactory manner as the temperature of expected use is decreased. Nevertheless, for extremely high temperatures and most severe environments, compositions having percentage compositions falling within the area enclosed by curve a will be preferred.

While my invention has been fully described and illustrated, it will be understood that this disclosure is for purposes of exemplification and is not to be taken by way of limitation, the spirit and scope of my invention being limited only by the terms of the accompanying claims.

I claim:

1. A high temperature, metal surface, protective coating composition consisting essentially of one part by weight of a dry mixture containing equal parts by weight of kaolin, vermiculite and graphite, and two parts by weight of a liquid vehicle, said mixture having a particle size of less than 60 mesh and a Mohs hardness of not greater than 5.

2. The composition of claim 1 wherein said mixture has a mean particle size of about 300 and a Mohs hardness of not more than 3.

3. A high temperature, metal surface, protective coating composition consisting essentially of one part by weight of a dry mixture having a Mohs hardness of not more than 5 containing equal parts by weight of mica, elemental carbon, and a hydrous aluminum silicate constituent and two parts by weight of a liquid vehicle.

4. A high temperature, metal surface, protective coating composition consisting essentially of a dry mixture containing a quantity of mica, elemental carbon, and a hydrous aluminum silicate constituent within the range represented by the area enclosed by curva a of FIGURE 1.

5. The composition of claim 4 and further including a liquid vehicle present in sufficient quantities to form a paste of brushable consistency.

6. A high temperature, metal surface, protective coating composition consisting essentially of a dry mixture containing a quantity of vermiculite, graphite and kaolin within the range represented by the area enclosed by curve a of FIGURE 1.

7. The composition of claim 6 and further including a liquid vehicle present in sufficient quantities to form a paste of brushable consistency.

8. A method for inhibiting thread seizure at high temperatures which comprises compounding a protective coating composition consisting essentially of a mixture containing a quantity of mica, elemental carbon and a hydrous aluminum silicate constituent within the range represented by the area enclosed by curve a of FIGURE 1, and applying said composition to the surfaces of a threaded element prior to its exposure to high temperatures.

9. The method of claim 8 in which said composition also includes a sufficient quantity of a liquid vehicle to form a paste of brushable consistency and in which said composition is applied to said threaded element by brushing on said surfaces.

10. An article having a surface modified by a thin continuous temperature-resistant coating obtained by treating the surface of a metal with a composition of claim 3.

11. A high temperature, metal surface protective coating composition consisting essentially of mica, carbon, and hydrous aluminum silicate in proportions within the range represented by the area enclosed by curve a of FIGURE 1, wherein said hydrous aluminum silicate is selected from the class consisting of montmorillonite, pyrophillite, halloysite, and kaolin.

12. A high temperature, metal surface protective coating composition consisting essentially of mica, carbon, and hydrous aluminum silicate in proportions within the range represented by the area enclosed by curve a in FIGURE 1, wherein said hydrous aluminum silicate is selected from the class consisting of montmorillonite, pyrophillite, halloysite, and kaolin, and wherein said mica is selected from the group consisting of vermiculite, muscovite, paragonite, biotite, phlogopite, and lepidomelane.

13. A high temperature, metal surface protective coating composition consisting essentially of mica, carbon, and hydrous aluminum silicate in proportions within the range represented by the area enclosed by curve a in FIGURE 1, wherein said hydrous aluminum silicate is selected from the class consisting of montmorillonite, pyrophillite, halloysite, and kaolin, and wherein said mica is selected from the group consisting of vermiculite, muscovite, paragonite, biotite, phlogopite, and lepidomelane, and wherein said carbon is selected from the group consisting of graphite, carbon black, and granulated coal.

14. The composition of claim 13, wherein said composition is composed of particles of a size less than 60 mesh.

15. The composition of claim 13, wherein said composition is composed of particles of a size less than 60 mesh and has a Mohs hardness of not greater than about 5.

16. The composition of claim 13, containing in addition a liquid vehicle in an amount sufficient to form a paste of brushable consistency.

17. A method for inhibiting thread seizure at high temperatures comprising applying the composition of claim 13 to the surfaces of a threaded element prior to the exposure to high temperatures.

18. A method for inhibiting thread seizure at high temperatures which comprises applying a composition of claim 16 to the surfaces of a threaded element prior to its exposure to high temperatures.

References Cited in the file of this patent

UNITED STATES PATENTS 1,787,964     Wallace                Jan. 6, 1931

OTHER REFERENCES

Bureau of Mines Information Circular 6720, May 1933.
The Condensed Chemical Dictionary, Reinhold Publishing Corp., 4th edition, 1950, page 445.